(12) United States Patent
Williams

(10) Patent No.: US 9,457,212 B2
(45) Date of Patent: Oct. 4, 2016

(54) FIRE EXTINGUISHER MOUNTING DEVICE

(71) Applicant: Williams Company Enterprises, LLC, Springfield, MO (US)

(72) Inventor: Rick Williams, Springfield, MO (US)

(73) Assignee: WILLIAMS COMPANY ENTERPRISES, LLC, Springfield, MO (US)

( * ) Notice: Subject to any disclaimer, the term of this patent is extended or adjusted under 35 U.S.C. 154(b) by 130 days.

(21) Appl. No.: 14/467,864

(22) Filed: Aug. 25, 2014

(65) Prior Publication Data

US 2016/0051849 A1 Feb. 25, 2016

(51) Int. Cl.
A47K 1/08 (2006.01)
A62C 35/68 (2006.01)
B26B 1/00 (2006.01)
F16B 1/00 (2006.01)

(52) U.S. Cl.
CPC .................. *A62C 35/68* (2013.01); *B26B 1/00* (2013.01); *F16B 1/00* (2013.01)

(58) Field of Classification Search
CPC ...... A62C 35/68; A62C 3/004; A62C 37/14; B26B 1/00; F16B 1/00
See application file for complete search history.

(56) References Cited

U.S. PATENT DOCUMENTS

| | | | |
|---|---|---|---|
| 5,570,745 A | 11/1996 | MacDonald, III | |
| 7,017,868 B2 | 3/2006 | Kirschner | |
| 7,185,567 B2 * | 3/2007 | Ide | B25B 13/06 |
| | | | 81/124.2 |
| 7,213,319 B2 | 5/2007 | Silva, Jr. et al. | |
| 7,667,136 B2 | 2/2010 | Dinh et al. | |
| 7,669,117 B2 | 2/2010 | Albornoz et al. | |
| 7,699,117 B2 | 4/2010 | Johnston et al. | |
| 9,278,240 B2 * | 3/2016 | Rekeny | F16F 1/025 |
| 2007/0169946 A1 | 7/2007 | Cordell et al. | |
| 2009/0139735 A1 | 6/2009 | Orr et al. | |
| 2011/0278029 A1 | 11/2011 | Newton | |

OTHER PUBLICATIONS

Fireman 24/7, Inc., "Cease Fire," retrieved from Internet: https://web.archive.org/web/20120217233622/http:/www.fireman247.com/ProductCeaseFire.aspx, 2010.
Cease Fire, Leader in Pre-Engineered Fire Suppression Technology brochure, "Product Line," 1986.

* cited by examiner

*Primary Examiner* — Amy Sterling
(74) *Attorney, Agent, or Firm* — Lathrop & Gage LLP

(57) ABSTRACT

A device for mounting a fire extinguisher into a ceiling is disclosed. The device incorporates a cutting mechanism to cut an installation hole into an existing ceiling. The device also incorporates tabs for retaining the device in the ceiling and securing a retaining collar to retain the fire extinguisher in the device.

8 Claims, 6 Drawing Sheets

FIRE EXTINGUISHER MOUNTING DEVICE

BACKGROUND

1. Field of the Invention

The device described herein relates to the field of devices for mounting fire extinguishers. More specifically, the device described herein relates to the field of devices for mounting fire extinguishers in existing structures.

2. Summary of the Invention

In an embodiment of a fire extinguisher mounting device disclosed herein the device comprises a carrier tube with a cylindrical wall open at the top and bottom ends. The carrier tube has at least one collar retainer tab extending downwardly from the bottom end of the cylindrical wall and at least one ceiling retainer tab extending outwardly from the cylindrical wall. A cutting mechanism is also provided at the top end of the cylindrical wall. The device also includes a retaining collar formed from a circular plate with a central port for the nozzle of a fire extinguisher. The retaining collar has a receptacle for attaching to the collar retainer tabs on the bottom end of the carrier tube.

In some embodiments, the cutting mechanism is serrations formed in the top end of the cylindrical wall. In other embodiments, the collar retainer tabs include a flange disposed on the end of the tabs.

In yet other embodiments, the ceiling retainer tabs are formed from a portion of the cylindrical wall cut on three sides and bent outwardly along the fourth side from the carrier tube.

In additional embodiments of the device, each of the ceiling retainer tabs, when pressed and released is sufficiently flexible to depress flush with the cylindrical wall and sufficiently resilient to spring back to the outwardly bent position.

In embodiments, the nozzle of the fire extinguisher will fit through the central port in the retaining collar but the cylinder of the fire extinguisher will not fit through the central port. In some embodiments, the cylindrical wall has one or more support ribs connecting the top end and the bottom end of the cylindrical wall to reduce the weight of the device.

The fire extinguisher mounting device may be used to mount a fire extinguisher into a ceiling. The fire extinguisher has a cylinder containing fire retardant or other material for suppressing or extinguishing a fire, and a nozzle attached to the cylinder for detecting a fire and automatically dispensing the fire retardant from the cylinder. The device may be used by placing the cutting mechanism of the carrier tube against the ceiling at a desired location for the installation of the fire extinguisher. The carrier tube is then rotated or oscillated to engage the cutting mechanism to cut a hole in the ceiling. The carrier tube is inserted into the hole until the ceiling retainer tabs engage the ceiling to prevent extraction of the carrier tube from the hole, the cylinder of the fire extinguisher is inserted into the carrier tube with the nozzle oriented in a downward direction, the nozzle of the fire extinguisher is placed through the central port of the retaining collar, and the retaining collar is engaged on the collar retainer tab to secure the retaining collar to the carrier tube with the nozzle of the fire extinguisher extending through the central port in the retaining collar.

When inserting the carrier tube into the hole each of the ceiling retainer tabs is depressed flush with the cylindrical wall and the carrier tube is inserted through the hole until each of the ceiling retainer tabs returns to the outwardly bent position above the ceiling.

DETAILED DESCRIPTION

The device as disclosed in reference to the embodiment depicted in the figures provides a fire extinguisher mounting device for installation into an existing ceiling. The device is capable of installation into an existing ceiling cavity without significant modifications to the ceiling.

Figure 1:
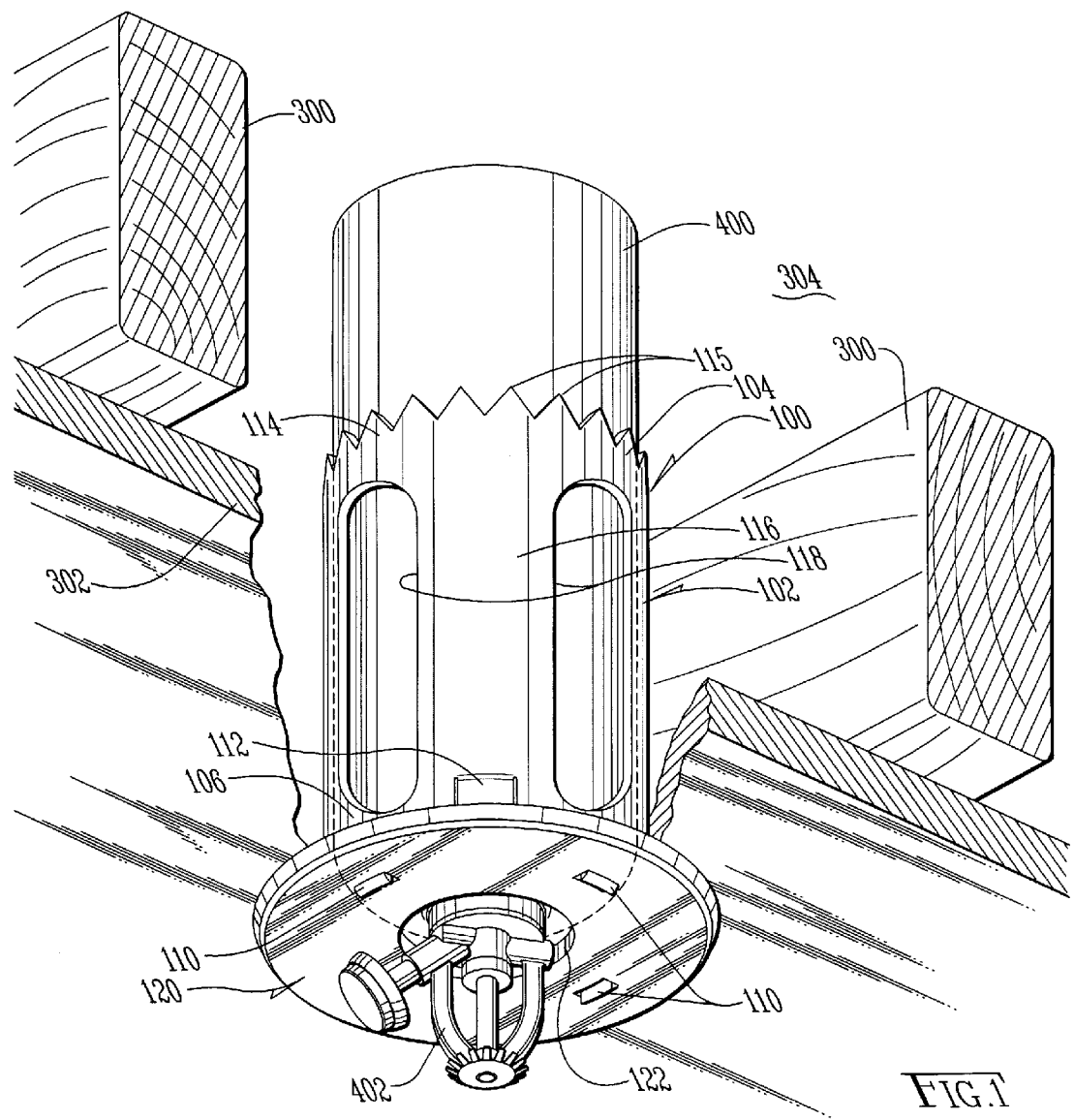
FIG. 1 is a perspective view of an embodiment of the fire extinguisher mounting device installed into a ceiling and holding a fire extinguisher.
Figure 2:
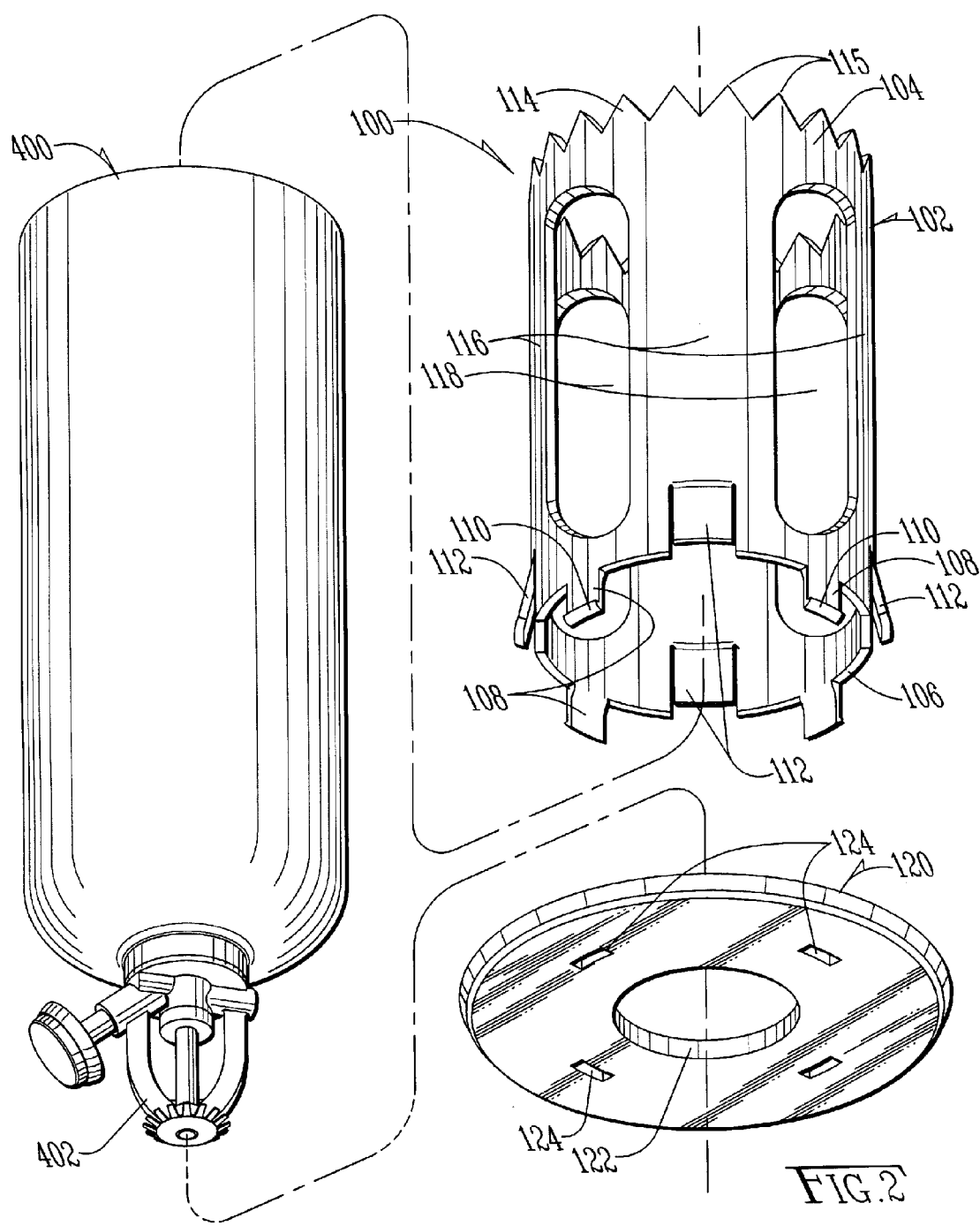
FIG. 2 is an exploded view of an embodiment of the fire extinguisher mounting device and a fire extinguisher.

Referring now to FIGS. 1 and 2, respectively, a perspective view of an embodiment of the fire extinguisher mounting device is depicted and an exploded view of an embodiment of the fire extinguisher mounting device and a fire extinguisher is depicted. The depicted portion comprises carrier tube 100 which is substantially cylindrical in cross-section. Tube 100 comprises a cylinder wall 102 that is open at a top end 104 and a bottom end 106. The tube 100 may accommodate fire extinguishers of varying lengths because the end of tube 100 is open, so long the diameter of the fire extinguisher is capable of insertion into the tube 100.

At least one collar retainer tabs 108 extend downwardly from the bottom 106 of cylinder wall 102 for engaging a retaining collar 120. In the depicted embodiment, retainer tabs 108 comprise a flange 110 extending outwardly from tabs 108 to engage the retaining collar 120. In other embodiments of the fire extinguisher mounting device, the retainer tabs 108 may be replaced with other means of releaseably attaching the retaining collar such as receptacles for receiving screws or bolts, or threads for mating to threaded portions of the retaining collar.

The cylinder wall 102 is also provided with at least one ceiling retainer tab 112 for engaging the ceiling in which the fire extinguisher mounting device is installed. Ceiling retainer tabs 112 may be formed from portions of cylinder wall 102 that are cut on three sides and bent outwardly from the wall 102 along a forth side disposed toward the top end of the carrier tube. Alternatively they may be tabs that are attached to cylinder wall 102 during manufacture of the device. The tabs 112 extend downwardly and outwardly at an angle from a point of attachment to the cylinder wall 102. Tabs 112 are sufficiently flexible to bend substantially flush to wall 102 when pressed from above, such as when tube 100 is inserted into a hole in a ceiling that is the diameter of wall 102. When tabs 112 are released they are sufficiently resilient to spring back to their position as depicted in FIG. 2 to prevent the removal of tube 100 back through any hole in a ceiling through which it has been inserted, by the engagement of the lower ends of tabs 112 with the top surface of the ceiling. In other embodiments the ceiling retainer tabs may be flush with carrier tube 100 until activated by turning a screw located inside carrier tube 100, nailing through carrier tube 100 into an adjacent ceiling joist or by other similar means known for retaining retrofitted utility boxes in the walls of structures. The retainer tabs 112 may also be separate pieces attached to cylinder wall 102 by screws or other similar means, and may allow for adjustment for the thickness of the ceiling material.

The top end 104 of the cylinder wall 102 is provided with a cutting mechanism 114 for cutting a hole in the ceiling in which the fire extinguisher mounting device is installed. In the depicted embodiment the cutting mechanism comprises serrations 115 that extend continuously around the top end 104 of cylinder wall 102 and are formed integrally with the cylinder wall 102. In other embodiments, the serrations may not be continuous around the top end 104 of the cylinder wall 102, but may be disposed at one or more discrete positions on the top end 104. In other embodiments, the cutting mechanism 114 may be a separate component from cylinder wall 102 that is attached to the top end 104 thereof. As described in relation to later figures, a user may rotate the tube 100 by hand or using a power tool to cut an installation hole.

In some embodiments of the mounting device, cylinder wall 102 may be an open frame cylinder wall with a plurality of support ribs 116 around the circumference of the carrier tube 100 separated by openings 118. This structure provides a lighter weight and more efficient mounting device.

The mounting device is also provided with a retaining collar 120 for covering the bottom end 106 of the carrier tube 100. The retaining collar 120 is provided with a central port 122. When a fire extinguisher 400 is installed in the mounting device, the nozzle 402 of the fire extinguisher extends downwardly through central port 122. The retaining collar 120 is also provided with at least one receptacle 124 for receiving the at least one collar retainer tab 108. In an embodiment the retaining collar 120 is releaseably attached to carrier tube 100 to allow the fire extinguisher cylinder to be removed and replaced as necessary. In the depicted embodiment the at least one receptacles 124 comprise slots in retaining collar 120 for receiving retainer tabs 108 and engaging flanges 110 to secure the retaining collar 120 on the bottom end 106 of carrier tube 100. The retaining collar may also provide decorative functions by covering the hole in which the carrier tube 100 is installed.

Figure 3:
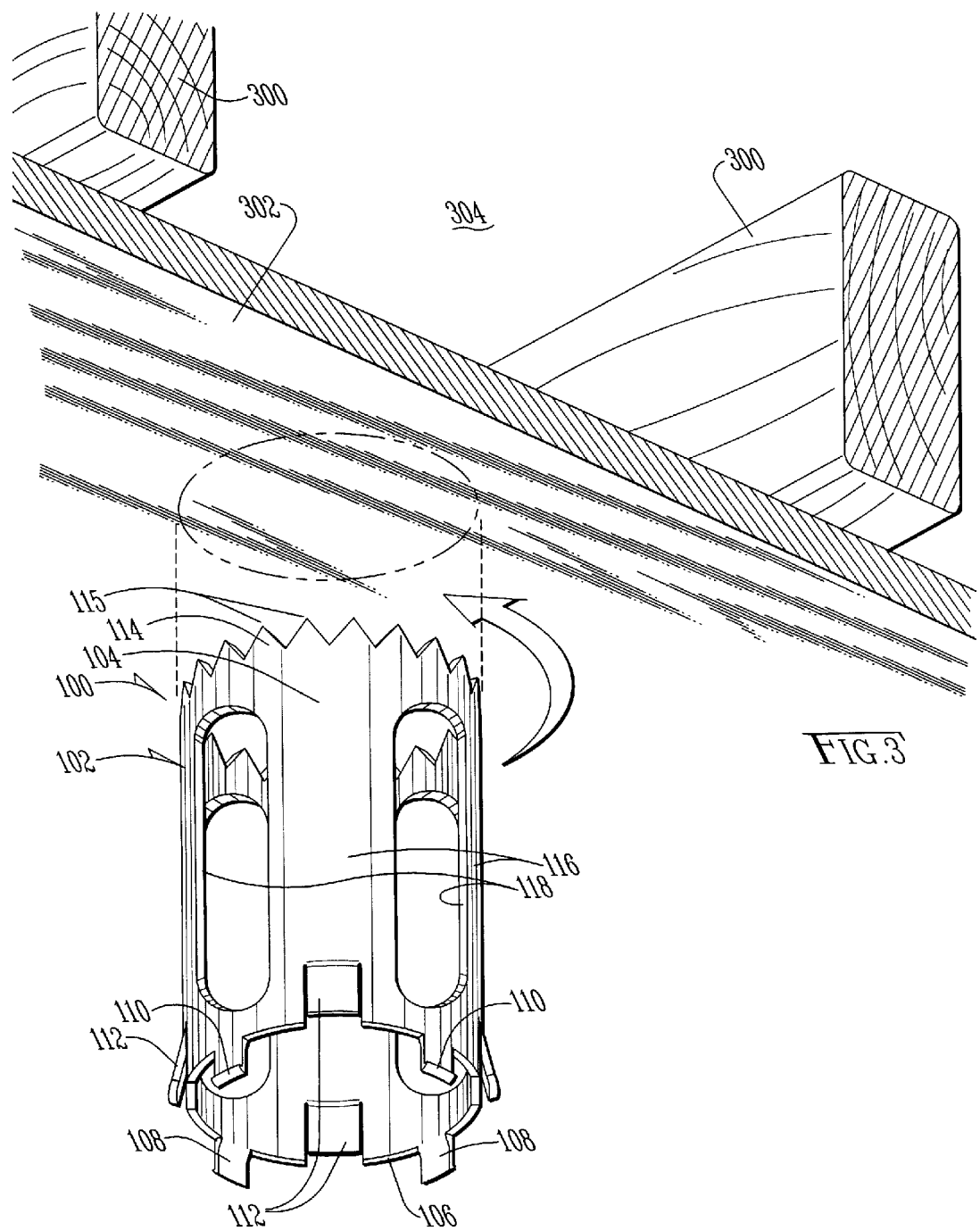
FIG. 3 is a view of a portion of an embodiment of the fire extinguisher mounting device during installation in a ceiling.

Referring now to FIG. 3, a view of a portion of an embodiment of the fire extinguisher mounting device in use on a ceiling is depicted. The ceiling system comprises ceiling joists 300 and ceiling 302, which is typically drywall or a similar building material. The fire extinguisher mounting device allows a fire extinguisher to be installed in the area between ceiling joists. When a desired location between ceiling joists 300 is identified, the cutting mechanism 114 is placed in the location, and the installer rotates, twists or oscillates the carrier tube 100 back and forth by hand causing the cutting mechanism 114 to engage and cut into the ceiling 302. As the carrier tube 100 is rotated or twisted the user urges it upward with sufficient force to cause the cutting mechanism 114 to cut into the ceiling 302.

Eventually the cutting mechanism 114 will cut a circular hole in ceiling 302 for receiving the carrier tube 100. The scrap piece of ceiling 302 may be removed and the carrier tube 100 is inserted into the ceiling 302 until the ceiling retainer tabs 112 are inserted into the cavity 304 between ceiling joists 300. Once the ceiling retainer tabs 112 have been inserted into the cavity 304 the carrier tube 100 is retained in the ceiling cavity 304 as ceiling retainer tabs 112 engage the top surface of ceiling 302 and prevent the extraction of the carrier tube 100.

The depicted cutting mechanism 114 comprises a series of teeth or serrations 115 formed into the top end 104 of the cylinder wall 102. In the depicted embodiment the cutting mechanism 114 is formed unitarily with the cylinder wall 102, but in other embodiments the cutting mechanism may be formed as a separate piece from the cylinder wall 102 and attached thereto. The teeth 115 shown in FIG. 3 extend around the entire circumference of the cylinder wall 102 in the depicted embodiment, but in other embodiments the cutting mechanism 114 may extend only partially around the circumference of the top end 104 cylinder wall 114 or may be disposed at a plurality of discrete portions of the circumference of the top end 104 of cylinder wall 102.

Figure 4:
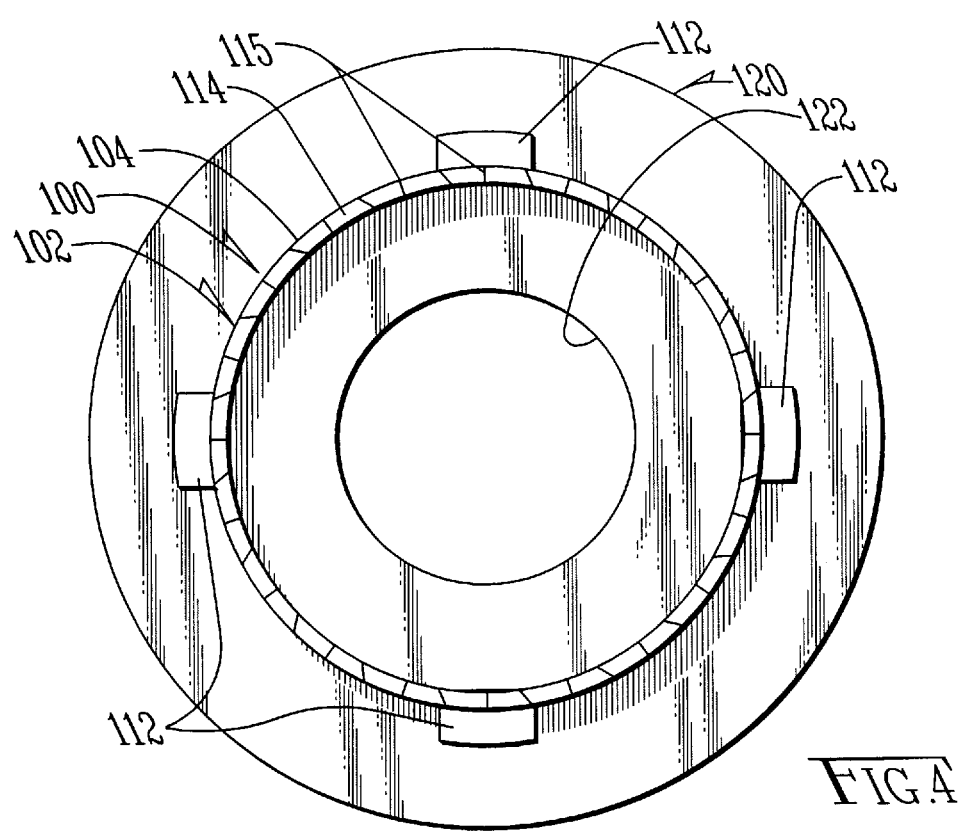
FIG. 4 is a top view of an embodiment of the fire extinguisher mounting device.

Referring now to FIG. 4, a top view of an embodiment of the fire extinguisher mounting device is depicted. Retaining collar 120 is attached to the bottom end 106 of cylinder wall 102 by engagement of collar retainer tabs 112 in slots 124. The cutting mechanism 114 comprises teeth 115 formed into the top end 104 of cylinder wall 102. Ceiling retainer tabs 112 extend outwardly from cylinder wall 102 to engage the top surface of a ceiling 302.

Figure 5:
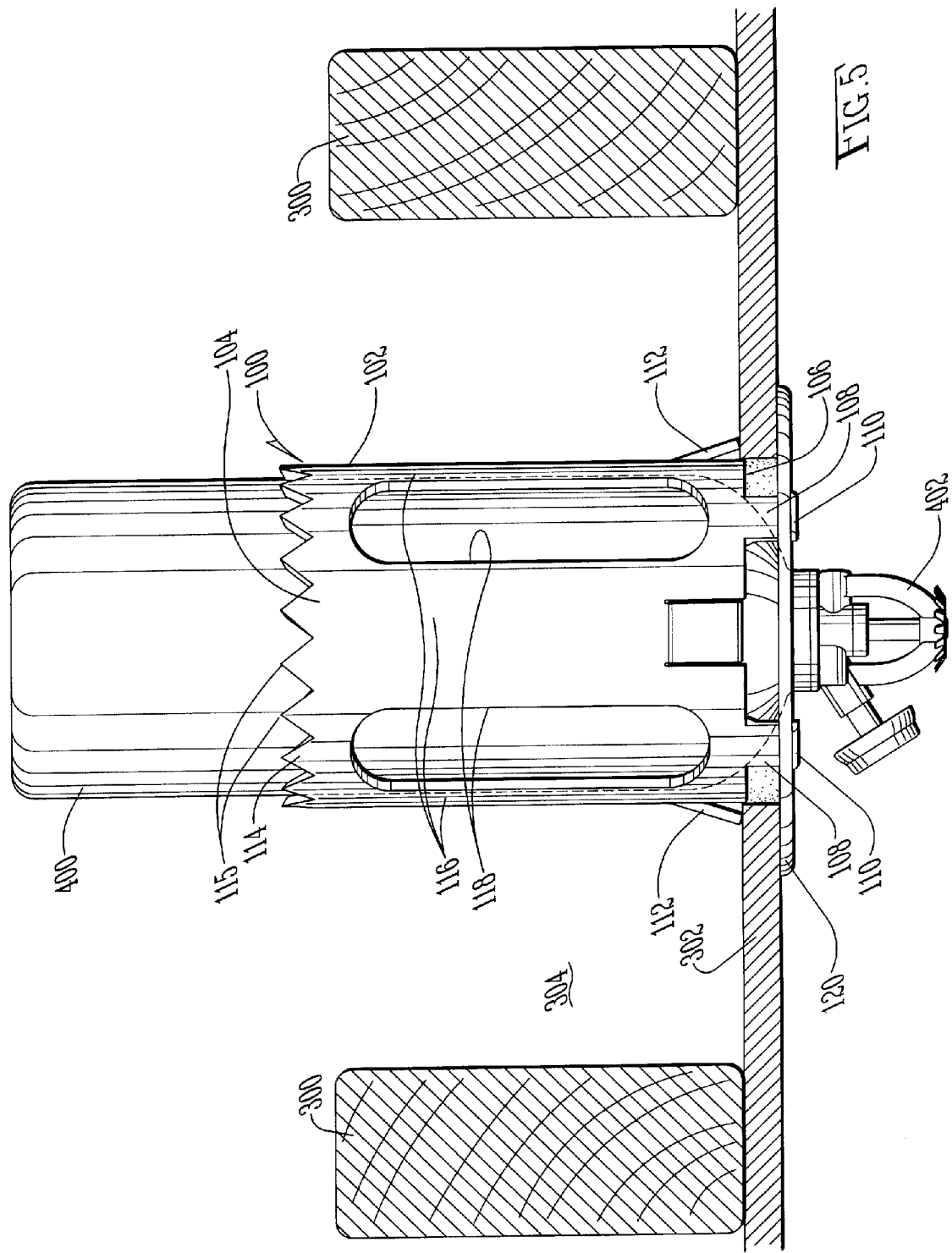
FIG. 5 is a side view of an embodiment of the fire extinguisher mounting device installed in a ceiling and with a fire extinguisher disposed therein.

Referring now to FIG. 5, a side view of an embodiment of the fire extinguisher mounting device is depicted as installed into a ceiling and with a fire extinguisher 400 disposed therein. After cutting the hole in the ceiling 302 using cutting mechanism 114, carrier tube 100 is inserted into cavity 304 between ceiling joists 300. Ceiling retainer tabs 112 are engaged with the top surface of ceiling 302 to prevent the removal of carrier tube 100 from the ceiling 302. Fire extinguisher 400 has been inserted into carrier tube 100 through bottom end 106 with nozzle 402 extending downwardly into the room. Collar 120 is installed over the nozzle 402 of fire extinguisher 400, with the nozzle extending through central port 122 of collar 120. The central port 122 is sized to allow the nozzle to extend downwardly through the port 122, while retaining cylinder 400 above collar 120 and inside cylinder wall 102.

Figure 6:
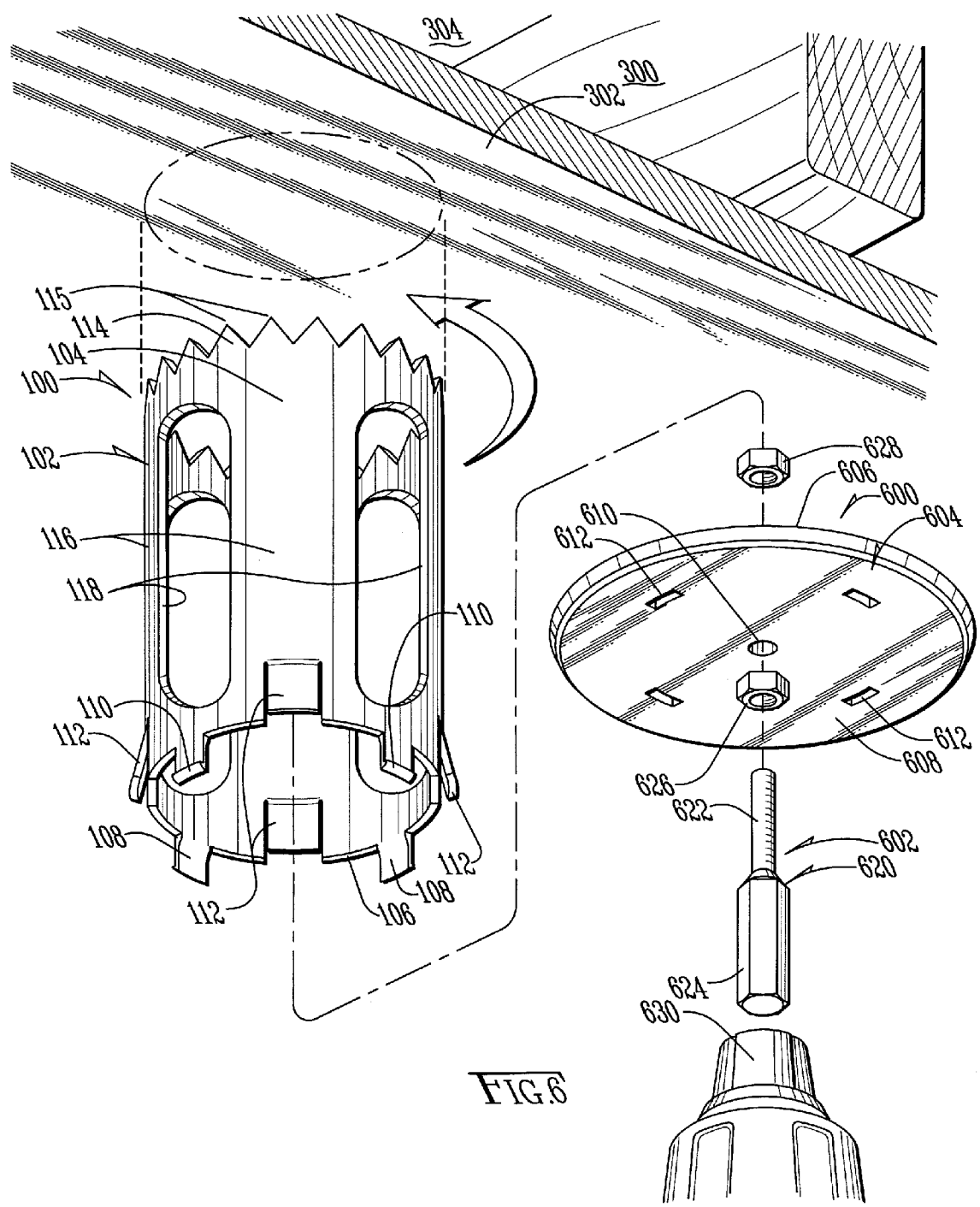
FIG. 6 is a perspective view of an embodiment of the fire extinguisher mounting device during installation in a ceiling using a power tool.

Referring now to FIG. 6, a perspective view of an embodiment of the fire extinguisher mounting device during installation in a ceiling is depicted. In this embodiment an optional component is provided for allowing installation via a power drill or similar tool. In this embodiment, a solid retaining installation collar 600 is provided for temporarily attaching to the carrier tube 100 during installation.

The collar 600 is a substantially flat and rigid disc 604 with a top surface 606 and bottom surface 608, though in other embodiments it may not be circular in shape. The collar 600 is provided with a central aperture 610 disposed substantially in the center of the disc 604. The central aperture in collar 600 is substantially smaller than aperature 122 to increase the rigidity and to provide for the attachment of the collar 600 to shaft 620. At least one slot 612 is provided in the collar 600 to receive and releaseably attached to retainer tabs 108 on carrier tube 100.

The embodiment depicted in FIG. 6 also comprises shaft 620 for mounting the collar 600 onto a drill or similar tool via the drill chuck or similar attachment mechanism. Shaft 620 is substantially perpendicular to the bottom surface 608 of collar 600 and is attached to collar 600 at a central point thereof with respect to the slots 612 so that cover 600 can be rotated or oscillated around an axis extending longitudinally within shaft 620. Shaft 620 comprises a collar end 622 and drill end 624. Collar end 622 is provided for attaching the shaft 620 to collar 600 by inserting the collar end 622 through central aperture 610. In the depicted embodiment, collar end 622 is threaded for receiving nuts, but in other embodiments other methods of attachment of collar end 622 to collar 600 may be utilized. Threaded nuts 626 and 628 are provided to secure the shaft 620 to the collar 600 by tightening the nuts on opposing top and bottom surfaces of disc 604. In other embodiments of the invention, the nuts may be replaced with other mechanisms for securing the collar 600 on the shaft 620, such as replacing nut 626 with a stop element incorporated into shaft 620, or providing threads in central aperture 610, or other similar attachment mechanisms.

Drill end 624 is provided for mounting in the chuck 630 of a drill or other similar rotary or oscillating tool. Drill end 624 may have a hexagonal cross-section as shown in FIG. 6, or it may be some other configuration designed to be mounted into a rotary or oscillating tool such as a drill. When used during installation, the threaded end 622 of shaft 620 is secured to collar 600. Drill end 624 of shaft 620 is then mounted onto a drill or other rotary or oscillating tool. Collar 600 is then temporarily attached to carrier tube 100 by inserting tabs 108 into slots 612. The mechanism 114 is then placed in the desired installation location, and the drill or other tool is activated to rotate or oscillate cover 600, which in turn rotates or oscillates carrier tube 100 causing serrations 115 to cut an installation hole into a wall or ceiling at a desired location. The optional collar 600 is then removed from the carrier tube, and the remainder of the installation process is the same as previously described in relation to a previous figure.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

What is claimed is:

1. A fire extinguisher mounting device comprising:
    a carrier tube comprising a cylindrical wall having an open top end and an open bottom end, at least one collar retainer tab extending downwardly from the bottom end of the cylindrical wall, at least one ceiling retainer tab extending outwardly from the cylindrical wall, and a cutting mechanism at the top end of the cylindrical wall; and
    a retaining collar comprising a circular plate having a central port and at least one receptacle for receiving the at least one collar retainer tab for securing the retaining collar over the bottom end of the carrier tube.

2. The fire extinguisher mounting device of claim 1 wherein the cutting mechanism comprises serrations formed in the top end of the cylindrical wall.

3. The fire extinguisher mounting device of claim 2 wherein each of the at least one collar retainer tab further comprises a flange disposed on the end thereof.

4. The fire extinguisher mounting device of claim 3 wherein each of the at least one ceiling retainer tab comprises a portion of the cylindrical wall cut on three sides and bent outwardly along the fourth side thereof from the carrier tube.

5. The fire extinguisher mounting device of claim 4 wherein each of the at least one ceiling retainer tab when pressed and released is sufficiently flexible to depress flush with the cylindrical wall and sufficiently resilient to spring back to the outwardly bent position.

6. The fire extinguisher mounting device of claim 5 wherein a nozzle of a fire extinguisher will fit through the central port in the retaining collar but a cylinder of a fire extinguisher will not fit through the central port.

7. The fire extinguisher mounting device of claim 6 wherein the cylindrical wall further comprises a plurality of support ribs connecting the top end and the bottom end of the cylindrical wall.

8. The fire extinguisher mounting device of claim 1 further comprising:
    an installation collar comprising a rigid circular plate having at least one receptacle for receiving the at least one collar retainer tab for releaseably securing the installation collar over the bottom end of the carrier tube; and
    a shaft attached to the installation collar at a central point thereof for rotating or oscillating the collar around the shaft.

* * * * *